United States Patent [19]

Nagano

[11] Patent Number: 5,171,187
[45] Date of Patent: Dec. 15, 1992

[54] FRONT DERAILLEUR

[75] Inventor: Masashi Nagano, Izumi, Japan

[73] Assignee: Shimano, Inc., Osaka, Japan

[21] Appl. No.: 610,568

[22] Filed: Nov. 8, 1990

[30] Foreign Application Priority Data

Nov. 14, 1989 [JP] Japan ............................ 1-132794[U]

[51] Int. Cl.[5] ............................................. F16H 59/00
[52] U.S. Cl. ...................................................... 474/82
[58] Field of Search ................................... 474/78–82, 474/101, 140, 144

[56] References Cited

U.S. PATENT DOCUMENTS

| 3,813,957 | 6/1974 | Huret et al. | 474/140 |
| 4,551,121 | 11/1985 | Nagano | 474/140 |
| 4,586,913 | 5/1986 | Nagano | 474/82 |
| 4,674,995 | 6/1987 | Iwasaki | 474/80 |
| 4,734,083 | 3/1988 | Nagano | 474/78 |
| 4,756,704 | 7/1988 | Nagano | 474/144 |
| 4,955,849 | 9/1990 | Nagano | 474/80 |
| 4,961,720 | 10/1990 | Juy | 474/80 |

FOREIGN PATENT DOCUMENTS 2597060 10/1987 France .
2621968 4/1989 France .
3-10142 3/1991 Japan .

Primary Examiner—Ramon S. Britts
Assistant Examiner—Roger J. Schoeppel
Attorney, Agent, or Firm—Dickstein, Shapiro & Morin

[57] ABSTRACT

A front derailleur is provided with a first pressing portion having an arc substantially coaxial with the front gears and including a first pressing point where a pressing operation of the chain engaging the small gear is started and a second pressing point where the shifting operation of the chain mounting the intermediate gear is completed when the chain is shifted from the small gear to the intermediate gear. The derailleur is further provided with a second pressing portion positioned radially outwardly of the front gears relative to the first pressing portion for pressing the chain when shifting from the intermediate gear to the large gear. A speed change subsidiary portion is provided between the first pressing portion and the second pressing portion for shifting a pressing operating position from the first pressing portion to the second pressing portion as the shifting operation of the chain proceeds in the second speed change operation, and allowing the chain to incline relative to the front gear in plan view.

7 Claims, 5 Drawing Sheets

FRONT DERAILLEUR

BACKGROUND OF THE INVENTION

1. Field of the Invention

The present invention relates to a front derailleur for effecting a speed change operation with respect to front gears of a bicycle with a front three step speed change mechanism comprising a small, an intermediate and a large gears, and more particularly to a front derailleur provided with a first pressing portion having an arc substantially coaxial with the front gears and including a first pressing point where a pressing operation of the chain engaging the small gear is started and a second pressing point where the shifting operation of the chain mounting the intermediate gear is completed when a first speed change operation is effected for shifting the chain from the small gear to the intermediate gear, the first pressing portion passing through the first and second pressing points, and with a second pressing portion positioned radially outwardly of the front gears relative to the first pressing portion for pressing the chain when a second speed change operation is effected for shifting the chain from the intermediate gear to the large gear.

2. Description of the Prior Art

An example of the conventional front derailleurs of this type is shown in FIG. 11. This derailleur comprises a derailleur body 2 including an inner guide plate 600 acting for mainly shifting the chain from the smaller gear to the larger gear and an outer guide plate 500 acting for shifting the chain from the larger gear to the smaller gear. The derailleur body 200 is parallel to the front gears G and moves perpendicularly to the gear through a four-point link mechanism 400 attached to a seat pipe 1 to effect a speed change operation. Since a mountain type bicycle or the like has recently been come into fashion, such front gears G for a front three step speed change mechanism are used for improving a traveling efficiency when traveling on a mountain road in a low or high torque as include a small gear GS having a considerably decreased diameter compared with an intermediate gear GM and a large gear GB and the intermediate and large gears having substantially the same diameters as the conventional gears. The front derailleur is manufactured to be suitable for such front gears G, which is characterized by the inner guide plate 600 having a larger vertical dimension than the conventional structure. An initial pressing point (referred as a first pressing point 700-A FIGS. 11 and 12) where the chain C engaging the small gear GS is pressed to be shifted to the intermediate gear GM is in a lower position compared with the conventional art. More particularly, in order to complete the shifting operation to the intermediate gear GM while pressing the chain C mounting the intermediate gear GM at a first pressing portion 700 profiling an arc from the first pressing point A substantially coaxially with the gears, a lower portion of the first pressing portion 700 is also positioned in a lower level than the conventional derailleur. With this structure, when a first speed change operation is effected for shifting the chain from the small gear GS to the intermediate gear GM, only the first pressing portion 700 contributes to press the chain C to complete the shifting operation.

When a second speed change operation is effected for shi...g the chain C from the intermediate gear GM to the ...rge gear GB, the speed change operation is initiated at a point positioned on the first pressing portion 700. The pressing point of the chain C moves upwardly toward a forward end of the first pressing portion 700 with advance of the speed change operation. As the pressing point moves, the chain is also pressed at a second pressing portion 800 positioned radially outwardly of the first pressing portion 700. FIG. 12 shows a positional relationship between the first pressing portion 700 and the second pressing portion 800 on the inner guide plate 600-a. The second pressing portion 800 around an extreme end thereof is substantially above the first pressing portion 700, and these pressing portions are formed of a plate continued in substantially the same plane. As a result, when the speed change operation further advances and the chain C mounts the large gear GB to complete the shifting operation, the chain C is pressed almost only by the second pressing portion 800.

With the above noted structure for effecting the speed change operation from the smaller gear to the larger gear, the speed change operation from the small gear GS to the intermediate gear GM can be advantageously effected by an extension 600a' provided downwardly of the inner guide plate 600. However, provision of the downward extension produces a problem when the chain C is shifted from the intermediate gear GM to the large gear GB. As seen from FIG. 11, the inner guide plate 600 overlies a lateral side portion GBa of the large gear GB when viewing from a bicycle body. Additionally, the chain C is pressed at a lateral side thereof by a portion of the plate between the first pressing portion 700 and the second pressing portion 800 in the course of shifting from the intermediate gear GM to the large gear GB. Thus, the chain C tends to extend parallel to the gear lateral side portion GBa and falls into a space between the inner guide plate 600 and the lateral side portion GBa of the large gear as the speed change operation proceeds, which results in bite or strain of the chain or the like to deteriorate an operational efficiency at the time of the second speed change operation.

SUMMARY OF THE INVENTION

An object of the present invention is to solve the foregoing conventional problems to provide an improved front derailleur having an extension downwardly of an inner guide plate for enhancing an operational efficiency in a first speed change operation with an enhanced operational efficiency in a second speed change operation as well.

In order to achieve the above object, the present invention provides a front derailleur comprising a speed change subsidiary portion disposed between a first pressing portion and a second pressing portion for shifting a pressing point of a chain from a first pressing portion to a second pressing portion as a chain shifting operation proceeds and permitting an inclination of the chain relative to the front gears in plan view.

With the above structure, a second pressing point is provided for pressing the chain mounting the intermediate gear, which allows the first speed change operation to be reliably completed through the first pressing portion. The second speed change operation starts from a point positioned on the first pressing portion, and the chain moves upwardly with advance of the speed change operation to shift the pressing point toward an extreme end of the first pressing portion. The chain is concurrently pressed at an advancing portion thereof by the second pressing portion. As the speed change operation further proceeds to move the chain upwardly, the chain falls into the speed change subsidiary portion. The speed change subsidiary portion is defined between the first pressing portion and the second pressing portion positioned on the inner guide plate and corresponds to the position where the chain is sandwiched between the plate portion and the large gear in the conventional art. The change speed subsidiary portion allows the chain to incline to a great extent not so as to be parallel to the large gear in plan view when shifting from the intermediate gear to the large gear, which prevents the chain from falling into a space between a lateral side portion of the large gear and the inner guide plate and advantageously guides the chain mounting the large gear just before completion of the shifting operation to suitably complete the shifting operation to the large gear.

It is also possible to remove a position where the chain engages the intermediate gear at the forward end of the first pressing portion in order to eliminate the chain restraint. However, such a structure cannot reliably guide the chain when the first speed change operation is completed, which deteriorates the change speed operational efficiency. On the other hand, in the structure of the present invention, the first pressing portion functions at an initial stage of the second speed change operation to shift the chain toward the large gear by a slight pressing force and thus to facilitate to produce an opportunity of the chain shifting operation and permit the smooth shifting operation from the intermediate gear to the large gear. Consequently, the improved front derailleur can be obtained which realizes the increased operational efficiency when the second speed change operation is effected by providing the speed change subsidiary portion in the derailleur having the extension downwardly of the inner guide plate for improving the operational efficiency when the first speed change operation is effected.

Other objects, structures and advantages will be apparent from the following description of preferred embodiments referring to the accompanying drawings.

BRIEF DESCRIPTION OF THE DRAWINGS

The drawings show preferred embodiments of the present invention in which:

FIG. 11 shows a prior art front derailleur; and

DESCRIPTION OF THE PREFERRED EMBODIMENTS

Figure 1:
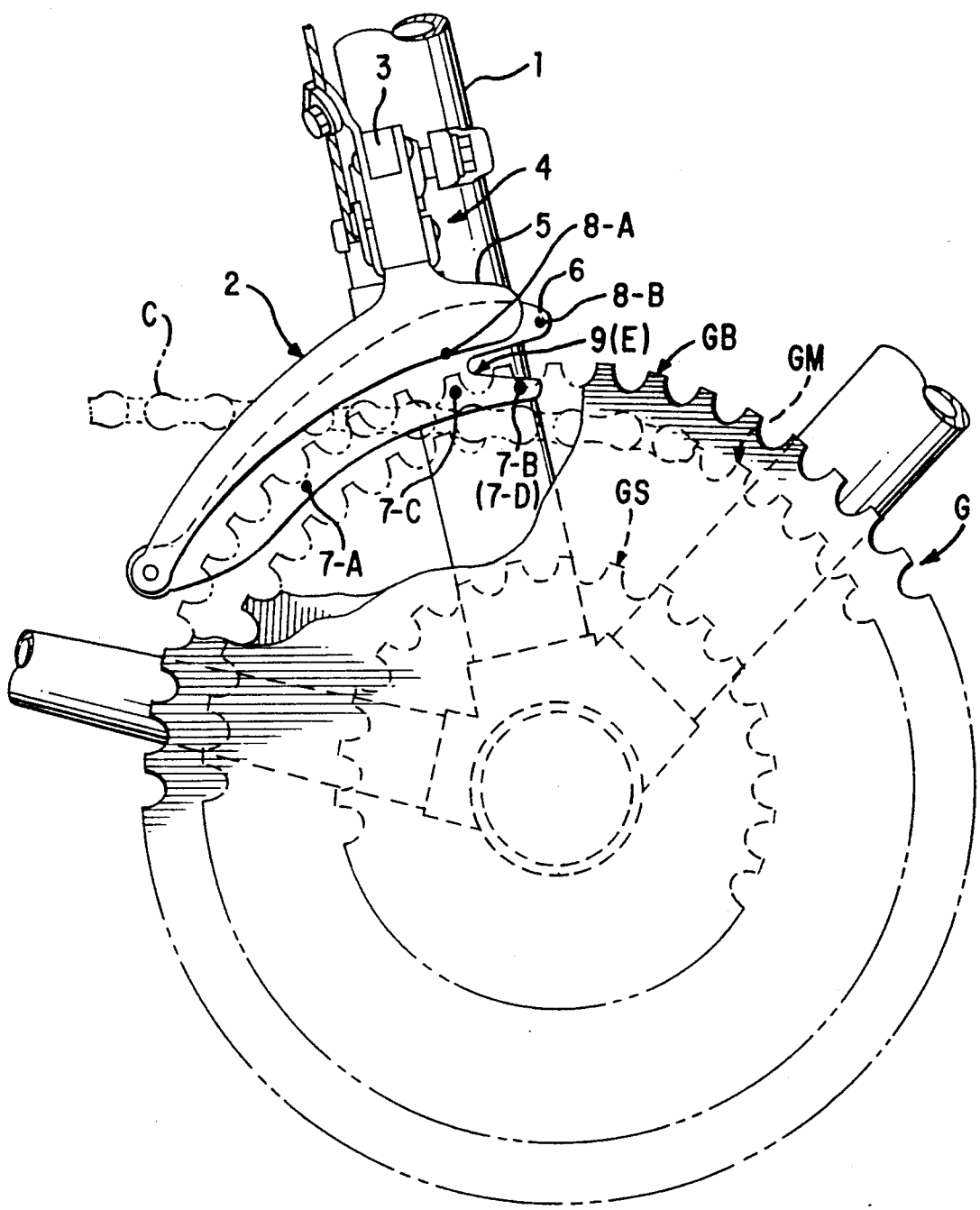
FIG. 1 shows a front derailleur relating to the present invention.

With reference to the accompanying drawings, preferred embodiments according to the present invention will be described below. FIG. 1 shows a structure in the vicinity of front gears G of a bicycle. The gears G comprise a small gear GS, an intermediate gear GM and a large gear GB, which are rotatably mounted on a bicycle body in the mentioned order substantially equidistantly with each other and cranked to a pedal not shown. More particularly, the large gear GB is arranged this side of the intermediate gear GM shown in an imaginary line. Owing to this structure, the bicycle of this type can realize a front side three step speed change. In order to effect a speed change operation, a derailleur body 2 connected to a base member 3 is attached to a sheet pipe 1 of the bicycle through a four-point link mechanism 4. The derailleur body 2 includes an outer guide plate 5 and an inner guide plate 6 arranged across a chain C. The derailleur body 2 is substantially parallel to the front gears G and is moved perpendicularly of the gears by the four-point link mechanism 4 thereby to effect a chain shifting operation. The outer guide plate 5 mainly shifts the chain from the larger gear to the smaller gear while the inner plate 6 mainly shifts the chain from the smaller gear to the larger gear. The present invention relates to a modification of a configuration of the inner guide plate 6 and an improvement of its functions.

Figure 2:
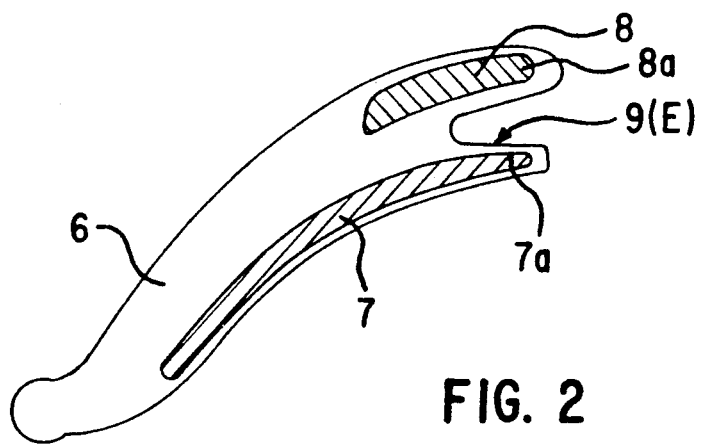
FIG. 2 shows a positional relationship between pressing surfaces on an inner guide plate.

A structure and functions of the inner guide plate 6 will be set forth hereinafter referring to FIGS. 2 to 6. The inner guide plate 6 has an arc substantially coaxial with the front gears G and defines a first pressing portion 7 adjacent a lower edge thereof and a second pressing portion 8 positioned radially outwardly of and above the first pressing portion 7. The inner guide plate 6 has a substantially forked front end portion and defines a cutout portion 9 acting as a speed change subsidiary portion E between the first and second pressing portions 7 and 8 as shown in FIG. 2.

Figure 3:
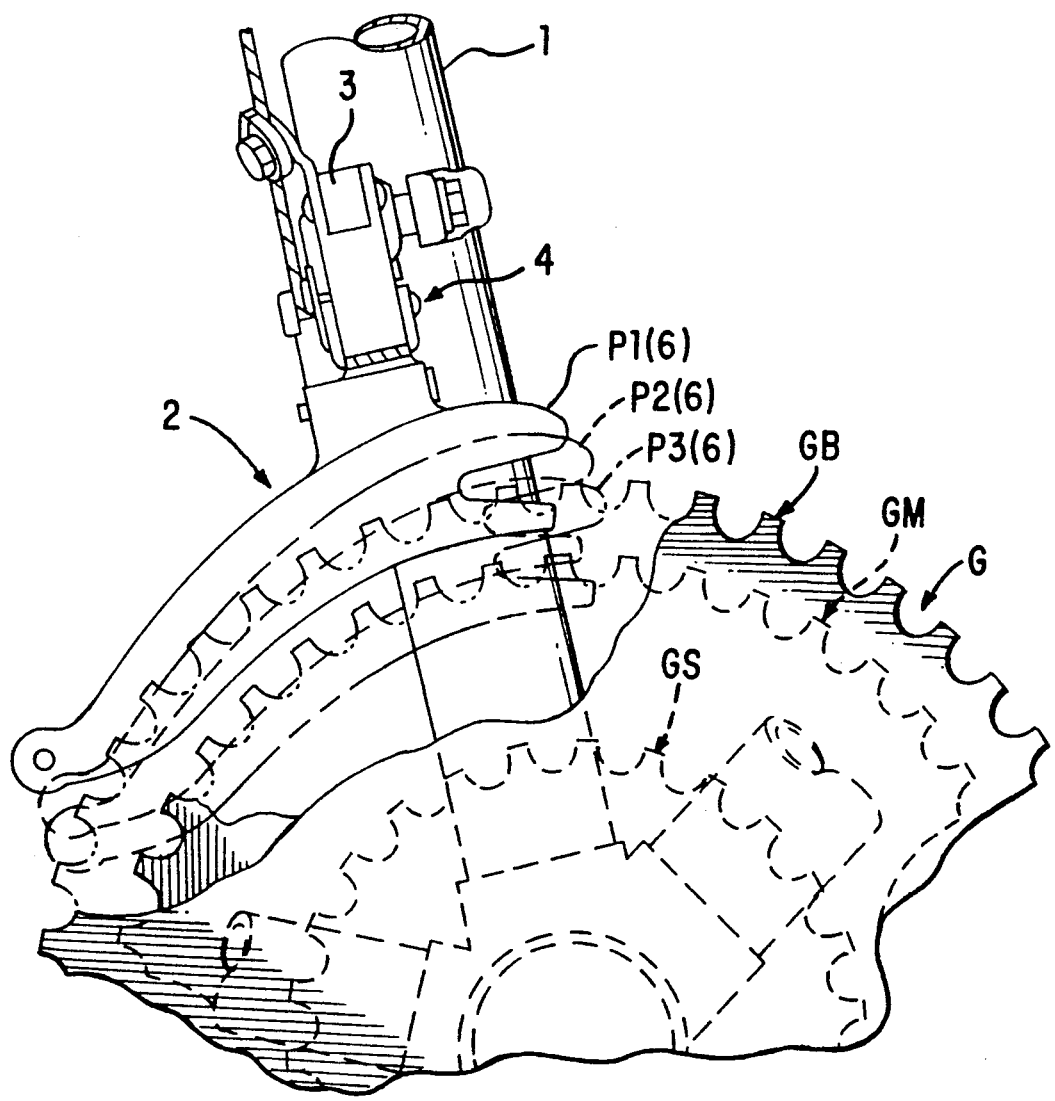
FIG. 3 shows movement of the inner guide plate when a speed change operation is effected.
Figure 4:
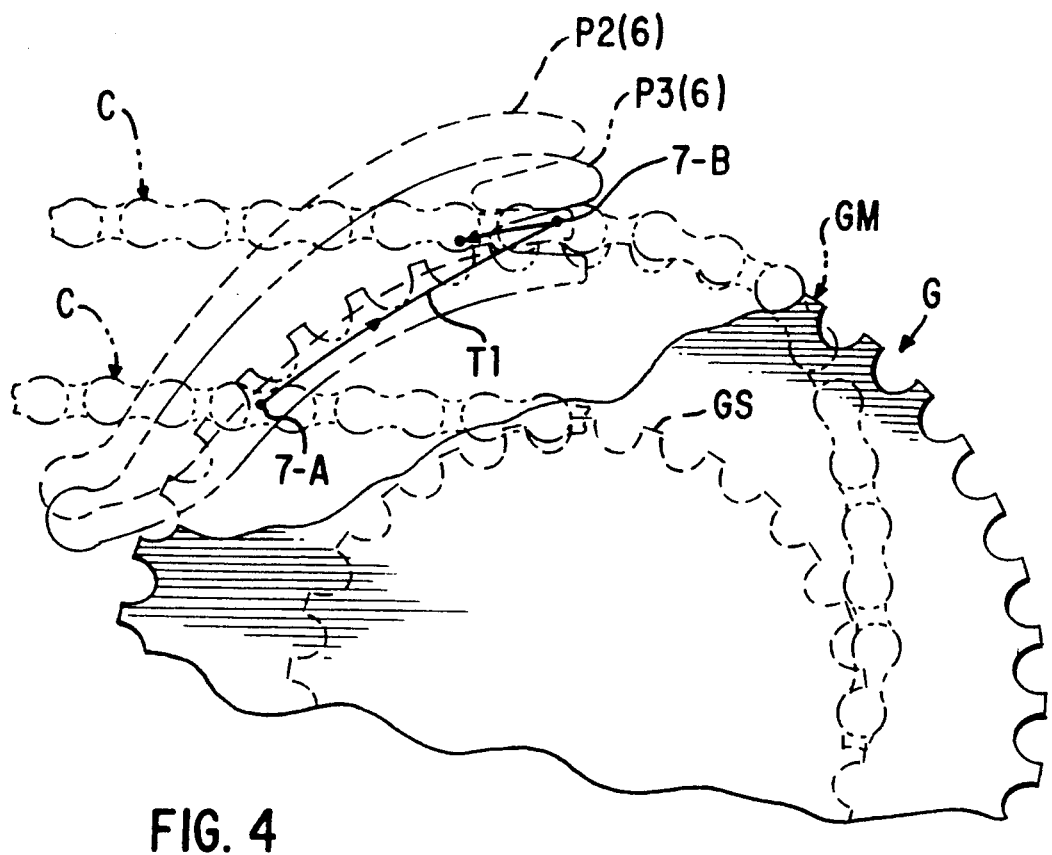
FIG. 4 shows movement of the inner guide plate when a first speed change operation is effected.
Figure 6:
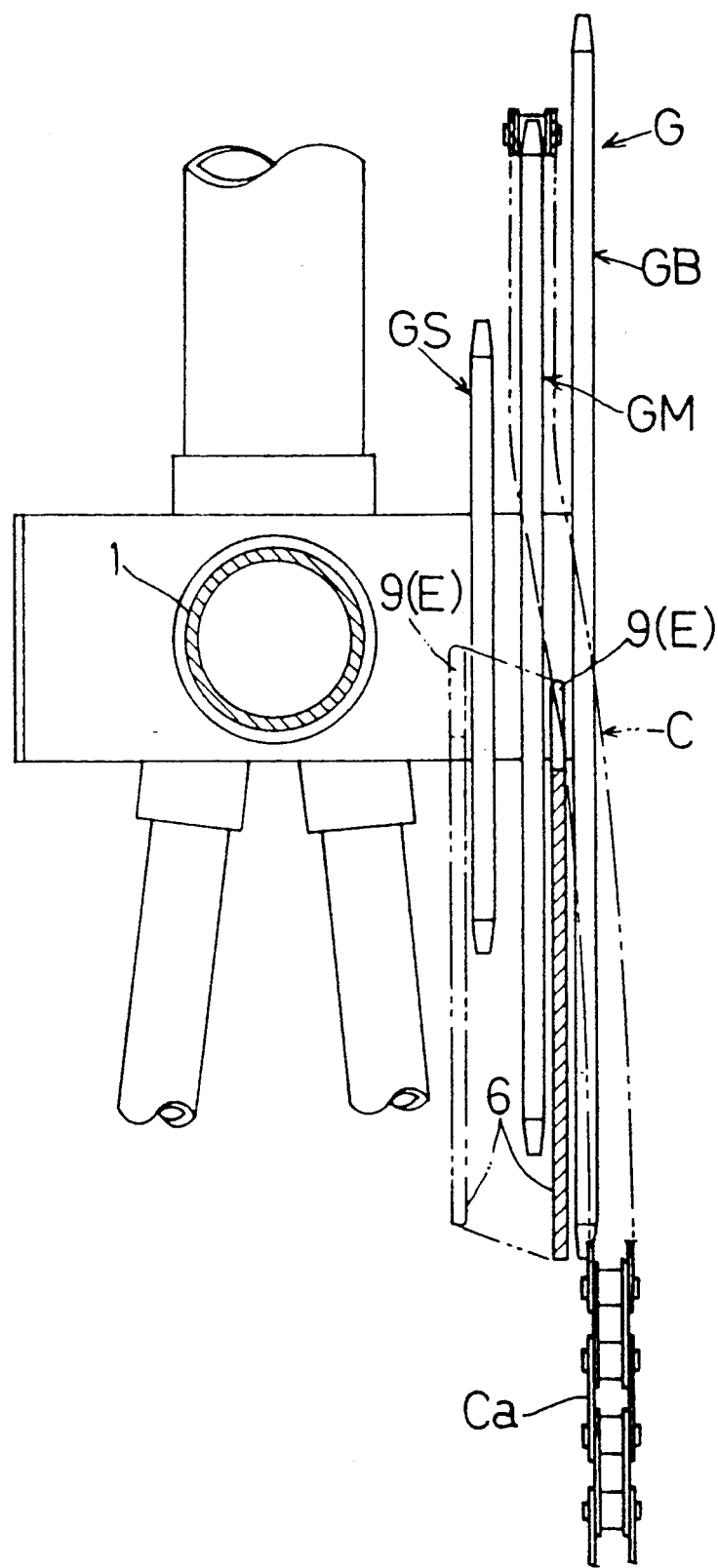
FIG. 6 shows movement of the inner guide plate in a transverse direction of a bicycle body when the speed change operation is effected.

With reference to FIG. 3 showing positions of the inner guide plate 6 after the chain is shifted to the small, intermediate and large gears, respectively, by movement of the derailleur body 2 with the speed change operation, a solid line P1 corresponds to the large gear GB, a broken line P2 to the intermediate gear GB, and a one-dot chain line P3 to the small gear GS, respectively. The inner guide plate 6 is moved not only vertically but also transversely of the bicycle body as shown in FIG. 6 with a two-dot chain line. FIG. 4 illustrates a condition when a first speed change operation is effected in which the inner guide plate 6 shifts the chain C from the small gear GS to the intermediate gear GM while contacting the chain C. In like manner as FIG. 3, plate positions corresponding to the respective gear positions are shown in the broken line P2 and the one-dot-dash chain line P3. A pressing operating position of the chain C is initially at a first pressing point 7-A and slides upwardly on the arcuate first pressing portion 7 as the shifting operation proceeds, passing through the first pressing point 7-A. Then, the chain C mounts the intermediate gear GM and is pressed up to a second pressing point 7-B to engage the intermediate gear GM. There is shown a locus T1 of the pressed chain when effecting the first speed change operation, which locus T1 is defined on the first pressing portion 7 according to the present invention. As seen from FIG. 4, with the chain C being engaged with the intermediate gear GM, the first pressing portion 7 extends forwardly such that the second pressing point 7-B is positioned forwardly of a point where the chain C starts to engage the teeth of the intermediate gear GM.

Figure 5:
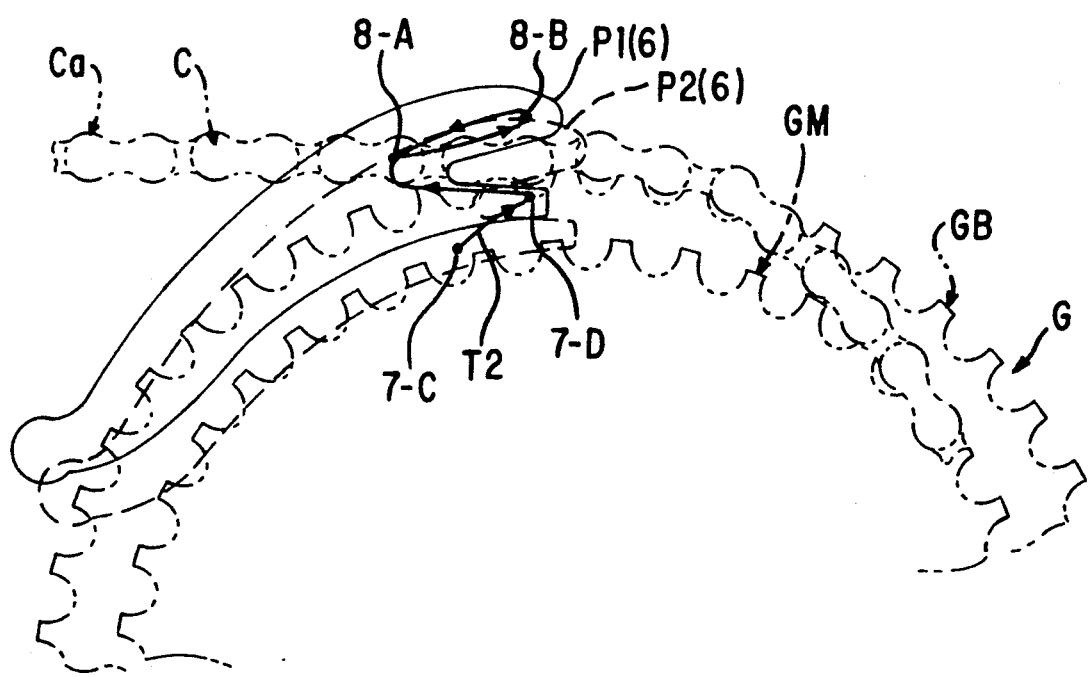
FIG. 5 shows movement of the inner guide plate when a second speed change operation is effected.

FIG. 5 shows a condition when a second speed change operation is effected in which the inner guide plate 6 shifts the chain C from the intermediate gear GM to the large gear GB while contacting the chain C. Likewise, the plate positions corresponding the respective gear positions are shown in the solid line P1 and the broken line P2. The pressing point of the chain C by the inner guide plate 6 starts at a point 7-C slightly below the second pressing point 7-B, and then proceeds to the vicinity of an extreme end 7-D of the first pressing portion 7 with the chain shifting operation. The chain C is also pressed at pressing point 8-A at the second pressing portion 8 positioned closer to a chain advancing direction than the first pressing portion 7. The chain C further moves upwardly around a position for mounting the large gear GB pressing point 8-B to engage the cutout portion 9 acting as the speed change subsidiary portion E. This condition is represented by the position of the chain C shown in FIG. 5. As seen from the above, a forward end portion of the chain C is engaged with or about to be disengaged from the intermediate gear GM as shown in FIG. 6. The chain C falls into the cutout portion 9 of the inner guide plate 6 backforwards pressing point 8-A to be inclined relative to the front gears G. A following chain portion Ca extends substantially along or overlies the large gear GB parallel thereto. Subsequently, the chain C starts to reliably engage the large gear GB to complete the chain shifting operation. A locus T2 of the pressing point of the chain at the time of the second speed change operation is shown in FIG. 5. What is important in the movement of the inner guide plate 6 of the present invention is that the first speed change operation is effected only by the first pressing portion 7 from start (pressing point 7-A) to end (pressing point 7-B), and that the second speed change operation starts from the first pressing portion 7 at pressing point 7-C and shifts to the second pressing portion 8 and through the speed change subsidiary portion 9 to complete the chain shifting operation. A lower portion 7a of the speed change subsidiary portion E of the first pressing portion 7 performs an important function in order to ensure completion of the chain shift in the first speed change operation and to produce at an early stage the inclination of the chain C relative to the front gears G (the intermediate gear GM) in the second speed change operation.

Figure 7:
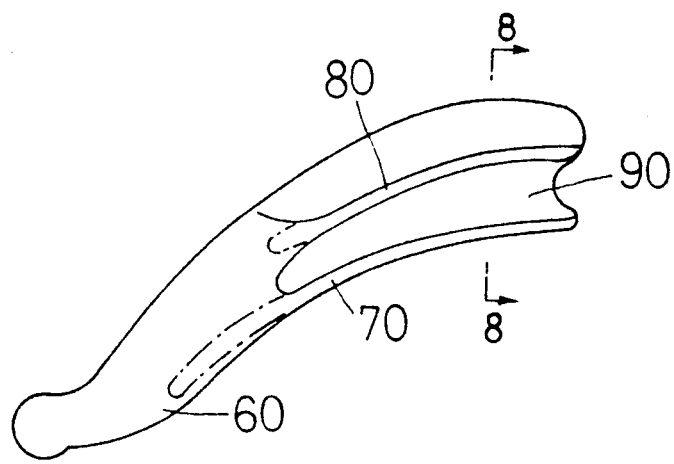
FIG. 7 shows a second embodiment of the inner guide plate corresponding to FIG. 2.
Figure 8:
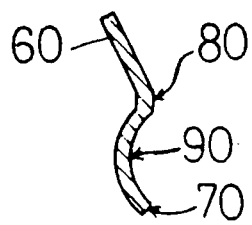
FIG. 8 is a vertical section taken along on a line 8—8 of FIG. 7.

According to the foregoing embodiment, the cutout portion 9 acting as the speed change subsidiary portion E is defined in the fixed portion of the inner guide plate 6, but this is dispensable. As shown in FIGS. 7 and 8, a plain plate may be bent to form an inner guide plate 60 and a recess 90 defined between a first pressing portion 70 and a second pressing portion 80 may be utilized as the speed change subsidiary portion E.

Figure 9:
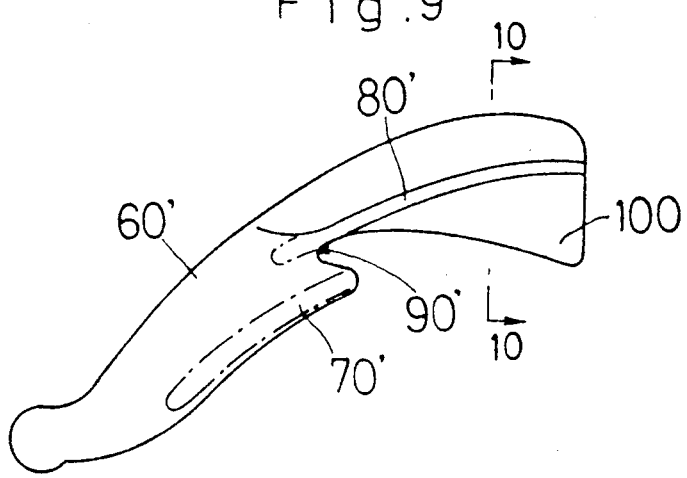
FIG. 9 shows a third embodiment of the inner guide plate corresponding to FIG. 2.
Figure 10:
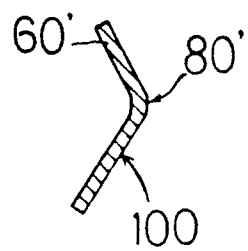
FIG. 10 is a vertical section taken along a line 10—10 of FIG. 9.
Figure 12:
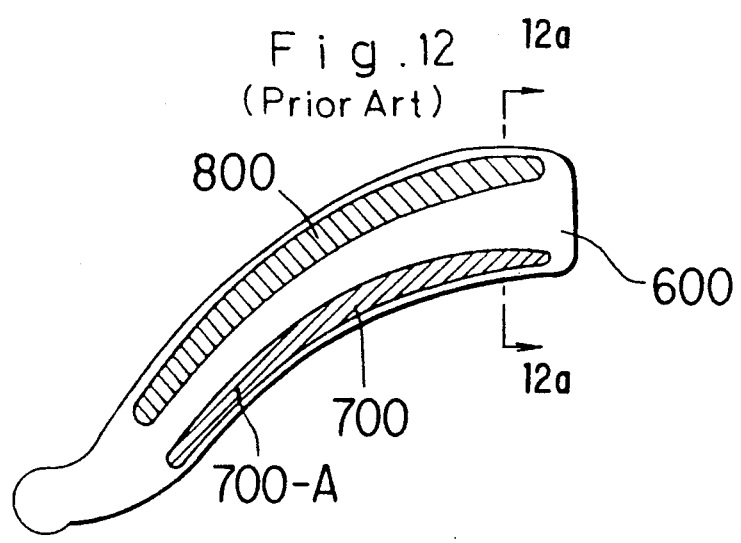
FIG. 12 shows the pressing surfaces on the inner guide plate of the FIG. 11 derailleur.
Figure 12A:

Alternatively, referring to FIGS. 9 and 10, an inner guide plate 60' may be formed such that a first pressing portion 70' has a forward end positioned rearwardly of a forward end of a second pressing portion 80'. As can be seen from FIG. 9, a cutout portion 90' acting as the speed change subsidiary portion E is also defined between the first pressing portion 70' and the second pressing portion 80'. Numeral 100 denotes a contact portion of the chain C for preventing the chain C from falling into the small gear when shifted from the large gear to the intermediate gear.

In addition, the speed change subsidiary portion may have not only the semi-elliptic configuration but also a triangular or rectangular configuration. The depth of the cutout portion may vary with the dimensions of the intermediate gear GM and the large gear GB, and the positional relationship therebetween.

What is claimed is:

1. A front derailleur for shifting a chain (C) between front gears (G) including a small gear (GS), an intermediate gear (GM) and a large gear (GB), the front derailleur including an inner plate (6) for shifting said chain from said small gear (GS) to said intermediate gear (GM) and from said intermediate gear (GM) to said large gear (GB), said inner plate (6) having:

a first pressing portion (7) defining an arc configuration substantially coaxial with the front gears (G) to pass through a first pressing point (7-A) and a second pressing point (7-B), said first pressing point (7-A) allowing the chain (C) engaging the small gear (GS) to be initially pressed when a first speed change operation is effected for shifting the chain (C) from the small gear (GS) to the intermediate gear (GM), said second pressing point (7-B) allowing the pressing operation relative to the chain (C) mounting the intermediate gear (GM) to be completed, a second pressing portion (8) positioned radially outwardly of the front gears (G) relative to the first pressing portion (7) for pressing the chain (C) when the derailleur contacts and shifts the chain (C) from the intermediate gear (GM) to the larger gear (GB) thereby to effect a second speed change operation, and a speed change subsidiary portion (E) provided between the first pressing portion (7) and the second pressing portion (8) for shifting a pressing operating position from the first pressing portion (7) to the second pressing portion (8) as the shifting operation of the chain (C) proceeds in the second speed change operation, and allowing the chain (C) to be displaced in a direction away from a side face of the front gears (G), said first pressing portion (7) and the second pressing portion (8) having distal end portions (7a, 8a), respectively, extending to the same peripheral position in a peripheral direction of the front gears (G).

2. A front derailleur as claimed in claim 1 wherein said speed change subsidiary portion (E) defines a recess.

3. A front derailleur as claimed in claim 1 wherein said speed change subsidiary portion (E) defines a cutout portion (9).

4. A front derailleur for shifting a chain (C) between front gears (G) including a small gear (GS), an intermediate gear (GM) and a large gear (GB), the front derailleur including an inner plate (6), said inner plate (6) having:

a first pressing portion (7) defining an arc configuration substantially coaxial with the front gears (G) to pass through a first pressing point (7-A), a second pressing point (7-B), a third pressing point (7-C) and a fourth pressing point (7-D), a second pressing portion (8) positioned radially outwardly of the first pressing portion (7) and defining an arc configuration substantially coaxially with the front gears (G) to pass through a fifth pressing point (8-A) and a sixth pressing point (8-B), said first pressing point (7-A) allowing a pressing operation relative to the chain (C) engaging the small gear (GS) to be initiated when a first speed change operation is effected for shifting the chain (C) from the small gear (GS) to the intermediate gear (GM), said second pressing point (7-B) allowing the pressing operation relative to the chain (C) mounting the intermediate gear (GM) to be completed in the first speed change operation, said third pressing point (7-C) allowing the pressing operation relative to the chain (C) to be initiated when a second speed change operation is effected for shifting the chain (C) from the intermediate gear (GM) to the large gear (GB), said fourth pressing point (7-D) allowing the pressing operation relative to the chain (C) on said first pressing portion (7) to be completed in the second speed change operation, said fifth pressing point (8-A) allowing the pressing operation relative to the chain (C) on said second pressing portion (8) to be initiated resulting from the shift of the pressing operating position from the first pressing portion (7) to the second pressing portion (8) in the second speed change operation, said sixth pressing point (8-B) allowing the pressing operation relative to the chain (C) mounting the large gear (GB) to be completed in the second speed change operation, and a speed change subsidiary portion (E) provided between the first pressing portion (7) and the second pressing portion (8) for shifting a pressing operating position from the first pressing portion (7) to the second pressing portion (8) as the shifting operation of the chain (C) proceeds in the second speed change operation, and having such a configuration as to restrain a pressure of the chain (C) against the front gears (G), said speed change subsidiary portion being located between second pressing point (7-B) and the sixth pressing point (8-B).

5. A front derailleur as claimed in claim 4 wherein said second pressing point (7-B) and said third pressing point (7-C) are defined in substantially the same position.

6. A front derailleur as claimed in claim 5 wherein said speed change subsidiary portion (E) defines a recess.

7. A front derailleur as claimed in claim 5, wherein said speed change subsidiary portion (E) defines a cut-out portion.

* * * * *